Aug. 3, 1926.

H. B. HARTMAN 1,594,948

OZONIZER FOR WATER PURIFYING MACHINES

Original Filed Oct. 10, 1921    2 Sheets-Sheet 2

Inventor
H. B. Hartman,
By
Attorney

Witnesses:—

Patented Aug. 3, 1926.

1,594,948

UNITED STATES PATENT OFFICE.

HARRY BUXTON HARTMAN, OF SCOTTDALE, PENNSYLVANIA, ASSIGNOR TO ELECTRIC WATER STERILIZER & OZONE COMPANY, OF SCOTTDALE, PENNSYLVANIA, A CORPORATION OF PENNSYLVANIA.

OZONIZER FOR WATER-PURIFYING MACHINES.

Original application filed October 10, 1921, Serial No. 506,543. Divided and this application filed October 6, 1922. Serial No. 592,817.

This invention relates to new and useful improvements in ozone and water mixing devices for water purifying machines, of the type disclosed in my copending application Serial No. 506,543 filed October 10, 1921, and of which the present case is a division.

One of the principal objects of the invention is to provide a plurality of mixing units which are each connected to a water intake manifold and also to an ozone intake manifold, whereby the water pressure will be evenly distributed to all of the mixing units. In that connection the invention has in view providing an apparatus of maximum capacity for a minimum space of installation, and in which the water and ozone is uniformly distributed to all of the units of the apparatus in a thoroughly effective and practical manner, thereby preventing the starving of one of the mixing units at the expense of another and insuring thorough and adequate contact between the water and ozone to obtain proper purification.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Similar reference characters designate corresponding parts throughout the several figures of the drawings.

Figure 1:
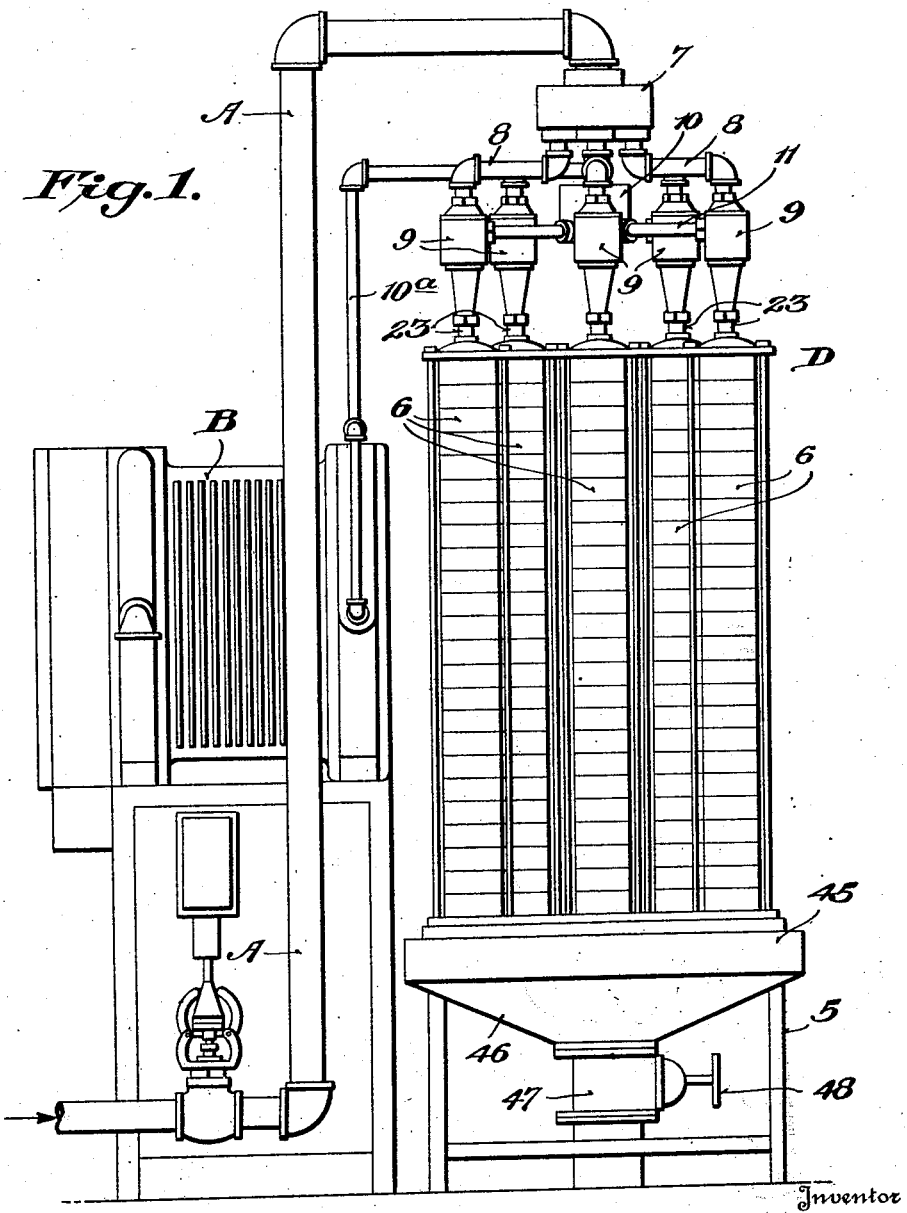
Figure 1 is an elevation of the apparatus constructed in accordance with the present invention.
Figure 2:
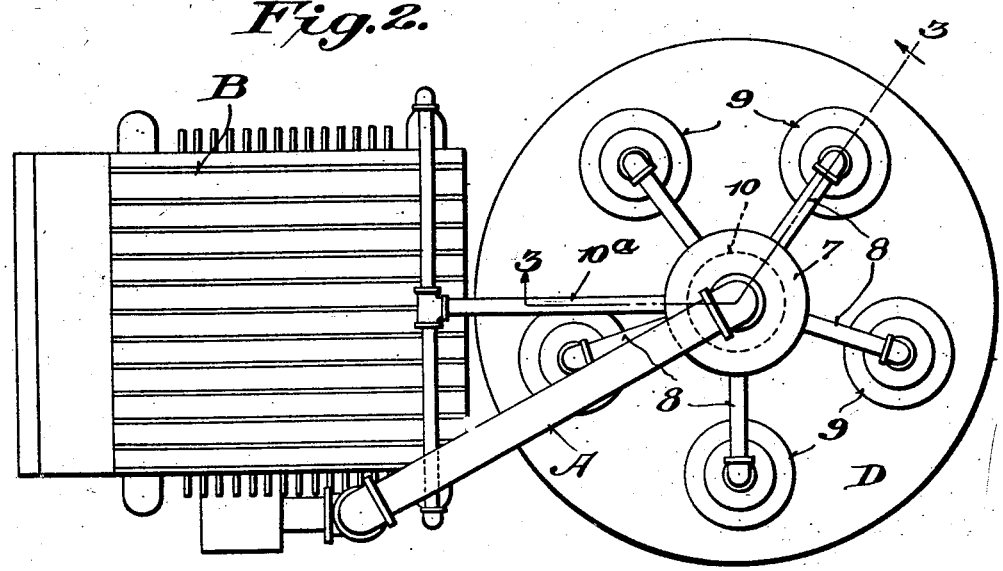
Figure 2 is a top plan view of the apparatus shown in Figure 1.
Figure 3:
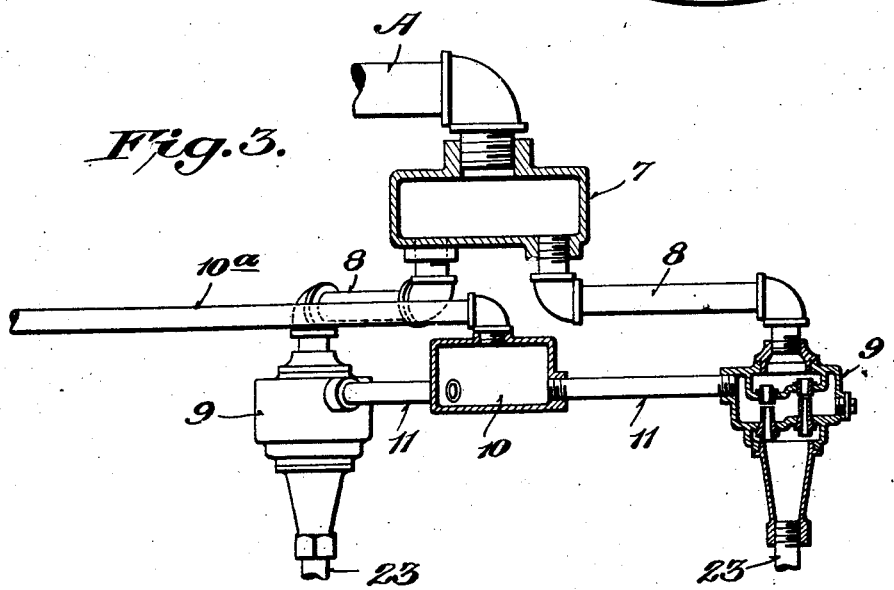
Figure 3 is a detail cross sectional view taken on the line 3—3 of Figure 2.

Referring to the drawings, the water supply pipe is designated generally as A, and the ozone generator is designated B.

Suitably mounted upon a support 5 is a mixing unit or tank consisting of a plurality of ozone and water mixing units, each designated as a whole by the numeral 6. The water supply pipe A is connected to a water distributing or intake manifold 7, and connected to this manifold are a plurality of water pipes 8 respectively connecting with the ejectors 9, there being one ejector connected with the upper portion of each mixing unit 6. An ozone distributing or intake manifold 10 is connected by a supply pipe 10ª with the ozone generator B and each ejector 9 is connected to the ozone intake manifold 10 by a pipe 11. The ozone and water mixing units 6 are preferably arranged in a circular series so as to occupy but very little space and so as to be advantageously positioned relative to the water inlet manifold 7 and ozone inlet manifold 10, which are centrally disposed above said mixing units.

The mixing units 6 are fully described in the parent application Serial No. 506,543 previously referred to, and rest upon the top of the discharge tank 45 carried by the support 5, whereby the said units discharge directly into the tank and against the conical bottom 46 thereof. This conical bottom terminates at its lower end in an outlet 47 which may be controlled by a valve 48. With this arrangement, the water pours down from the mixing columns 6 into and against the conical bottom 46 of the tank, and as the water runs out of the conical bottom it forms a vortex which sets up a suction that draws the excess of ozone through the pipe 47, so that if the apparatus is used in connection with swimming pools and the like the ozone will be carried through the connections and bubble up through the water in the pool thereby purifying the same and fully utilizing the benefit of the ozone thus drawn out of the apparatus.

In operation, water is fed under pressure through the pipe A to the water intake manifold 7 and from this manifold the water is evenly distributed to the ejectors and thence to the inlet pipes 23 of the mixing units. The ozone is fed from the generator B through the pipe 10ª to the ozone intake manifold 10. The water passing through the ejectors draws equal quantities of ozone from the ozone manifold 10 through the pipes 11 to the respective ejectors, and thus the water and ozone begin to mix in the ejectors, from which they are discharged under pressure through the inlet pipes 23 to the mixing units 6. After the ozone and water pass from the said units they are discharged into the tank 45 and as the mixture strikes the lower or conical wall 46 of the tank and makes its way to the outlet 47 a liquid vortex is produced which draws ozone into the pipe line and distributes it into the swimming pool or other point of use.

From the foregoing it will be apparent that one of the novel and distinctive features of the present invention is to provide a water purifying machine including a mixing device D consisting of a plurality of water and ozone mixing units 6, which units are supplied with ozone and water from relatively centrally located water and ozone manifolds whereby both the water and ozone will be evenly distributed through the several units making up the mixing device. As shown in the drawings the individual mixing units 6 are preferably arranged in a circular series while the manifolds are centrally arranged. However, it will be obvious that the position of the units may be changed without altering the invention, and also that the number may be greater or less than shown in the drawings and still attain the same desirable results. These individual mixing units are supported upon a common discharge tank 46 having a conical bottom which produces a vortexing action in the discharging liquid thereby having the desirable advantages heretofore pointed out.

Without further description it is thought that many features and advantages of the invention will be readily apparent to those skilled in the art, and it will of course be understood that changes in the form, proportion and other minor details of construction may be resorted to without departing from the spirit of the invention or scope of the appended claim.

I claim:—

A water purifying apparatus comprising a support, a discharge tank having a conical bottom and mounted on said support, an outlet leading from the apex of said bottom, an annular series of tubular mixing units mounted on said tank and discharging thereinto, an injector for the head of each unit, an ozone manifold disposed centrally relatively to said injectors and having radial pipes communicating with the sides of the injectors, a centrally disposed water distributing manifold arranged above said ozone manifold and having a plurality of pipes communicating with the tops of the injectors.

In testimony whereof I hereunto affix my signature.

HARRY BUXTON HARTMAN.